United States Patent [19]

Gay et al.

[11] Patent Number: 4,940,766

[45] Date of Patent: Jul. 10, 1990

[54] ACRYLATE AND/OR METHACRYLATE-SUBSTITUTED ORGANOPOLYSILOXANES

[75] Inventors: Michel Gay; Edith Canivenc, both of Lyons, France

[73] Assignee: Rhone-Poulenc Chimie, Courbevoie, France

[21] Appl. No.: 84,181

[22] Filed: Aug. 12, 1987

[30] Foreign Application Priority Data

Feb. 24, 1987 [FR] France .................................. 87 02617

[51] Int. Cl.$^5$ ............................................. C08G 77/08
[52] U.S. Cl. ....................................... 528/18; 528/26; 556/440; 556/467; 556/469
[58] Field of Search ..................... 528/18, 26; 556/440, 556/437, 467, 469

[56] References Cited

U.S. PATENT DOCUMENTS

| | | | |
|---|---|---|---|
| 2,922,806 | 1/1960 | Merker | 528/26 |
| 4,189,546 | 2/1980 | Delchert et al. | 528/26 |
| 4,207,155 | 6/1980 | Martin et al. | 522/165 |
| 4,294,974 | 10/1981 | LeBoeuf | 556/440 |
| 4,503,208 | 3/1985 | Lin et al. | 528/26 |
| 4,558,111 | 12/1985 | Tolentino | 556/440 |
| 4,562,238 | 12/1985 | Kondo et al. | 528/18 |
| 4,575,545 | 3/1986 | Nakos et al. | 528/26 |
| 4,597,987 | 7/1986 | Hockemeyer et al. | 528/26 |
| 4,621,029 | 11/1986 | Kawaguchi | 528/18 |

FOREIGN PATENT DOCUMENTS

| | | |
|---|---|---|
| 0097333 | 4/1984 | European Pat. Off. |
| 0159729 | 10/1985 | European Pat. Off. |
| 2040975 | 9/1980 | United Kingdom |

OTHER PUBLICATIONS

"Organotin Compounds as Transesterification Catalyst" *Journal of Organometallic Chemistry*, 173 (1979) C7–C8, Poller et al.

*Primary Examiner*—John C. Bleutge
*Assistant Examiner*—Ralph H. Dean, Jr.
*Attorney, Agent, or Firm*—Burns, Doane, Swecker & Mathis

[57] ABSTRACT

Organopolysiloxane oils comprising acrylate and/or methacrylate functional groups, well adapted as additives for silicone elastomers, or for UV-curable silicone coating compositions, are prepared by transesterifying an organopolysiloxane including at least one (HOY)R$_2$SiO$_{0.5}$ or (HOY)RSiO$_{2/2}$ recurring unit, with a lower alkyl (meth)acrylate having the formula CH$_2$=CR'O-COR", in the presence of a catalytically effective amount of a tin compound.

16 Claims, No Drawings

ACRYLATE AND/OR METHACRYLATE-SUBSTITUTED ORGANOPOLYSILOXANES

BACKGROUND OF THE INVENTION

1. Field of the Invention

The present invention relates to the preparation of an organopolysiloxane containing acrylate and/or methacrylate functional groups bonded to the polysiloxane chain through a SiC linkage.

2. Description of the Prior Art

The demand for organopolysiloxanes of the foregoing type is greatly increasing because they provide faster crosslinking rates than the commercially available vinylated organopolysiloxanes. Such organopolysiloxanes containing acrylate and/or methacrylate groups are typically in the form of diorganopolysiloxane oils and may be formulated either alone or in combination with unsaturated polymers or monomers, to be subsequently crosslinked, generally by UV radiation. Thus, U.S. Pat. No. 3,577,264 describes film-forming paint binders, which can be crosslinked by radiation, containing such oils. U.S. Pat. No. 4,035,355 describes the crosslinking of these oils in an anaerobic medium. European Patent EP-A-016,663 describes their use as antiadhesive coatings. Silanes which can be hydrolyzed, useful as adhesion enhancers for fiberglass reinforcing materials, are described in British Patent No. 949,126, certain of these silanes being prepared by the hydrosilylation of allyl methacrylate.

However, it is well known from the literature that the reaction of hydrosilylating compounds containing an allyl substituent in the presence of a platinum catalyst may give rise to undesirable secondary reactions, especially those entailing production of propene, unless the silicon hydride contains electron donor groups such as chlorine or carbonyl groups. Compare in this respect J. L. Speier et al, *J. AM. CHEM. SOC.*, 82, 3601 (1980) and U.S. Pat. Nos. 4,503,208 and 3,767,690.

U.S. Pat. Nos. 4,011,247 and 4,554,339 describe diorganopolysiloxanes containing both acryloxy units and SiH units.

According to U.S. Pat. No. 4,554,339, gammahydroxypropylated oils are esterified at the end of the polymer chain with acrylic acid utilizing an acidic earth of the montmorillonite type. This process has the disadvantage of requiring separation of the solid catalyst upon completion of the reaction.

A process for the preparation of diorganopolysiloxane oils containing acrylate and/or methacrylate groups, and which ma additionally contain hydroxyalkyl groups, by reacting the corresponding diorganopolysiloxane oil containing hydroxyalkyl groups with acryloyl or methacryloyl chloride, in the presence of triethylamine and forming the corresponding amine hydrochloride, is described in U.S. Pat. Nos. 4,261,875 and 4,294,974. The principal disadvantage of this method is precisely the need for the removal of the amine hydrochloride produced.

Moreover, the following phenomena are well known in organic chemistry, outside the field of the silicones:

(i) preparation of esters of higher alcohols, deemed heavy esters, by the transesterification of an ester of a lower alcohol, deemed a light ester, with such higher alcohols;

(ii) promotion of the transesterification by using an excess of the light ester and use of such ester as the entraining agent for the lower alcohol produced during the reaction;

(iii) acceleration of this reaction by using a catalyst; and (iv) optional recycling of the light ester/light alcohol fraction into the production of the light ester itself.

This reaction, as applied to light acrylates and methacrylates and to heavy alcohols, using a titanium phenoxide (French Patent No. 2,033,441), zinc oxide (U.S. Pat. No. 3,714,234) and dialkyltin oxide (East German Patent DD-A-205,891) is known.

SUMMARY OF THE INVENTION

Accordingly, a major object of the present invention is the provision of an improved industrial process for the preparation of an organopolysiloxane, especially a diorganopolysiloxane oil containing acrylate and/or methacrylate functional group bonded to the polysiloxane polymer chain through an SiC linkage, and which improved process obviates those disadvantages and drawbacks to date characterizing the state of this art, namely, the production of considerable amounts of by-products, the need to filter the catalyst and/or reaction by-product, and the occurrence of undesirable polymerization reactions.

Briefly, the present invention features a process for the preparation of an organopolysiloxane, especially a diorganopolysiloxane oil containing acrylate and/or methacrylate functional groups, comprising at least partially transesterifying, in the presence of a catalytically effective amount of a tin-containing compound (A), an organopolysiloxane (B) containing at least two siloxy units per molecule, at least one of such units having the formula:

$$HOY-SiO_{3-a/2} \quad | \quad R_a \tag{1}$$

in which a is 1 or 2, the symbols R, which may be identical or different, are each a $C_1$-$C_{12}$ (inclusive) alkyl radical, a phenyl radical or a 3,3,3-trifluoropropyl radical, at least 80 mole % of the radicals R being methyl radicals, and the symbols Y, which may be identical or different, are each a $C_1$-$C_{18}$ (inclusive) straight or branched chain alkylene linkage, with an ester (C) of the formula:

$$CH_2=C-COOZ \quad | \quad X \tag{2}$$

in which X is a hydrogen atom or a methyl radical and Z is a $C_1$-$C_6$ (inclusive) alkyl radical, preferably a methyl radical During the transesterification reaction, the alcohol produced, having the formula ZOH, is removed, preferably continuously, by azeotropic distillation with the ester (C).

DETAILED DESCRIPTION OF THE PREFERRED EMBODIMENTS OF THE INVENTION

More particularly according to the present invention, the starting material organopolysiloxane (B) advantageously is a diorganopolysiloxane oil corresponding to the formula:

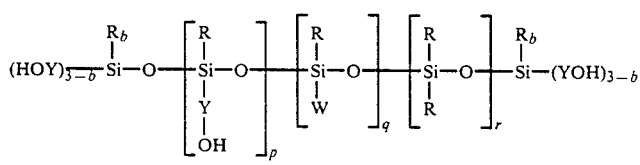

in which:
b is 3 or 2; p is an integer ranging from 1 to 50, inclusive, preferably from 1 to 16, with the proviso that p may be equal to 0 when b = 2;
q is an integer ranging from 0 to 30, inclusive, preferably from 0 to 8, inclusive;
r is an integer ranging from 0 to 500, inclusive, preferably from 2 to 50;
R nd Y are as defined in formula (1) above; and
W is a functional group which is inert towards the transesterification reaction.

When the copolymers of formula (1) comprise a mixture containing the same units, but in different numbers, as in the case of certain of the examples below, this mixture may, of course, be represented by an average formula (3) in which p, q and r may be real numbers.

As examples of the alkyl radicals R, representative are methyl, ethyl, propyl and butyl radicals.

As examples of the diorganopolysiloxane units $R_2SiO$, representative are:

$(CH_3)_2SiO$ $(CH_2=CH)(CH_3)SiO$ $(C_6H_5)(CH_3)SiO$ $(C_6H_5)_2SiO$ $(CF_3-CH_2-CH_2)(CH_3)SiO$

As examples of the linkages Y, representative are: —$CH_2$—, —$(CH_2)_2$—, —$(CH_2)_3$—, —$CH_2$—$CH(CH_3)$—$CH_2$—, —$(CH_2)_{12}$—. The linkage —$(CH_2)_3$— is the preferred.

As examples of the group W, representative are dialkylaminoalkyl and glycidyloxyalkyl groups.

The organopolysiloxane (B) and those corresponding to the formula (3) are widely described in the literature.

The catalyst (A) may be any inorganic and/or organic compound of tin. However, it is preferred to use compounds of tin having a valency of 4.

Dialkyltin oxides, the alkyl radicals of which contain 1 to 18 (inclusive) carbon atoms, such as N-butyltin oxide, di-n-octyltin oxide, di-(2-ethylhexyl)tin oxide and the reaction products of such dialkyltin oxides wit organic esters such as dimethyl maleate and diethyl phthalate or alkyl silicates such as methyl or ethyl silicate, as described in detail in U.S. Pat. Nos. 2,597,920 and 3,839,246 and British Patent No. 1,551,868, are particularly preferred.

All the tin catalysts which are used as catalysts for hardening elastomeric compositions of silicones which are crosslinked by polycondensation are useful herein. Tin carboxylates such as dialkyltin dicarboxylates, especially di-n-butyltin or di-n-octyltin dilaurate, di-n-octyltin or di-n-butyltin diacetate [see text by Noll, CHEMISTRY AND TECHNOLOGY OF SILICONES, 2nd Edition, page 337, Academic Press (1968)]and dialkyltin diversatates (U.S. Pat. No. 3,678,002) may thus be used.

Reaction products of dialkyltin dicarboxylates with silicates or their products of partial hydrolysis, as described in French Patent No. 1,343,138 and U.S. Pat. Nos. 3,186,963 and 3,862,919, and tin chelates described in U.S. Pat. No. 3,055,845 and in European Patent EP-A-147,323 may also be used.

The catalyst (A) may be introduced at the same time as the reagents (B) and (C), or in small amounts during the course of the reaction.

The amount of catalyst used may vary considerably. It generally comprises 0.001 to 2%, preferably 0.01 to 0.5%, by weight of tin metal relative to the weight of the reaction mass (B)+(C).

The amount of ester (C) preferably ranges from approximately 1.1 to 5 moles of (C) per equivalent of alcohol groups YOH contained in (B). However, an insufficient amount of (C) may be used, or an incomplete transesterification reaction may be carried out, if it is desired to permit free alcohol groups to remain.

Various reactions which are inert with respect to acrylate or methacrylate groups may be carried out involving such free alcohol groups, and it is possible, in particular, to react same with diketene in the presence of an acid catalyst such as p-toluenesulfonic acid or a basic catalyst such as a tertiary amine, especially triethylamine, triethylamine, and the like, in order to provide the betaketoester groups:

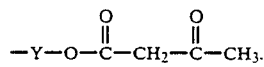

This reaction may be carried out in bulk or preferably, in an organic solvent medium such as xylene or toluene.

The reaction of a hydroxyalkyl group with diketene is well known to the art and is especially described in A. B. Boese, *Industrial and Engineering Chemistry*, Int. Ed., 32, pages 16 to 25 (1940) and in R. N. Lacey, *Advances in Organic Chemistry, Methods and Results*, Vol. 2, pages 240 to 248.

The transesterification reaction is typically carried out at a temperature of from 50° to 160° C., preferably from 80° to 120° C., most frequently at the azeotropic distillation temperature of the ester (C) and the free alcohol. Reduced pressures may be used in order to avoid excessively high temperatures in the reaction mixture. It is therefore preferable to use a catalyst (A) which does not distil and which is stable under the reaction conditions, such that it continues to exert its catalytic activity.

The reaction is preferably carried out in bulk, but it may also be carried out in the presence of an organic solvent such as xylene and toluene.

The transesterification reaction is preferably carried out, on the one hand, in the presence of 0.1 to 1% by weight relative to the weight of the reaction mass of a phenolic antioxidant such as, for example, hydroquinone and resorcinol, and, on the other hand, under an inert atmosphere, for example, under nitrogen, preferably by bubbling it through the reaction medium to enhance the continuous removal of the alcohol/product (C) azeotrope.

The functionalized oil thus produced may be decolorized, if required, by passing it through activated charcoal, although this operation is generally unnecessary.

If, on the other hand, the process of the invention is carried out using a titanium catalyst such as tetraalkoxytitanium, a colored oil is produced, which cannot be decolorized, even by passing it through activated charcoal.

Zirconium catalysts also cannot be used.

Thus, the use of tetralkoxyzirconium gives rise to a gelation of the reaction medium, probably due to reactions involving the bridging of hydroxyalkyl groups via zirconium, namely:

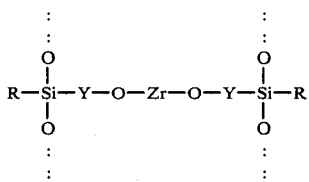

In order to further illustrate the present invention and the advantages thereof, the following specific examples are given, it being understood that same are intended only as illustrative and in nowise limitative.

EXAMPLE 1

A 500-ml three-necked round-bottomed flask heated with an oil bath at 100° C. and equipped with a central stirrer, a reflux condenser and swept with a stream of nitrogen bubbled through the reaction medium, was charged with 40 g of a gamma-hydroxypropylated oil having the average formula:

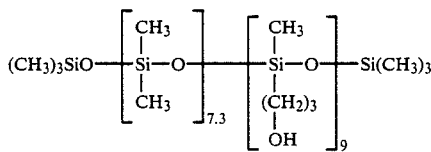

with an alcohol group content of 485 meq/100 g (meq=milliequivalent) and a methyl methacrylate (MMA) content of 68 g, which amounted to a molar ratio MMA:OH group of 3.5:1.

The reaction product of 2 moles of dibutyltin oxide with 1 mole of methyl myristate for 1 hr, 30 minutes, at 140° C., following the description in U.S. Pat. No. 2,597,920, was used as the tin catalyst.

A pale yellow oil containing 32% by weight of tin was obtained.

1.68 g of this reaction product, which represented approximately 0.16% by weight of tin relative to the weight of the reaction mass, and 0.27 g of hydroquinone, which amounted to 0.25% by weight relative to the weight of the reaction mass, were charged.

The reaction was carried out for 20 hours, under stirring. When the reaction was complete, the excess MMA was removed by distillation for 1 hour at 70° C., at 0.4 KPa.

A clear oil which was practically colorless and stable during storage, having the following average formula which was in agreement with the NMR spectrum, was obtained:

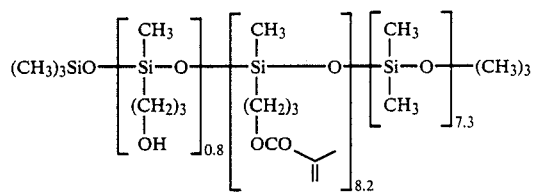

EXAMPLE 2

Exactly the same operations as in Example 1 were carried out, except that 1.13 g of di-n-butyltin oxide, which amounted to 0.16% by weight of tin metal relative to the weight of the reaction mass and 0.26 g of hydroquinone, were used.

A clear oil, 92 mole % of the gamma-hydroxyalkyl groups of which were transesterified, was obtained.

EXAMPLE 3

Exactly the same operations as in Example 1 were carried out, except that 5.4 g of di-n-butyltin dilaurate, which amounted to 0.95% of tin metal relative to the weight of the reaction mass and 0.52 g of hydroquinone, were used.

A clear oil, 58 mole % of the gamma-hydroxyalkyl groups of which were transesterified, was obtained.

EXAMPLE 4

The procedure in Example 1 was repeated, except that the following were used: 40 g of a gamma-hydroxypropylated oil of the formula:

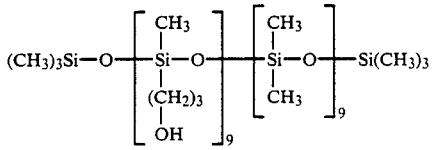

having a titer of 468 meq/100 g,
65.5 g of MMA,
1.13 g of di-n-butyltin oxide, which amounted to 0.15% by weight of tin metal relative to the weight of the reaction mass, and
0.26 g of hydroquinone.

The reaction was carried out for 1 hour at 100° C., and, when the reaction was complete, the excess MMA was removed by distilling for 1 hour at 0.4 KPa.

An oil of the following formula was obtained:

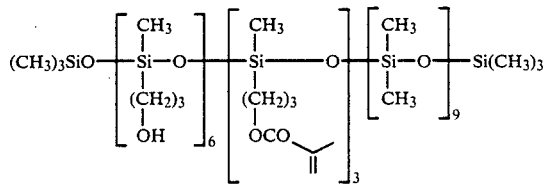

EXAMPLE 5

A 500-ml three-necked round-bottomed flask equipped with a central stirrer, a reflux condenser and a thermometer holder was charged with 100 g of the oil produced in Example 4.

1 ml of triethylamine and 150 ml of toluene were added and the homogeneous mixture thus obtained was then heated to 45°-50° C. 27.7 g of diketene were then added, maintaining the temperature at 50° C. A slight exothermicity was observed especially at the initial stages of the addition. When the addition was complete, the temperature was maintained at 50° C. for a further period of 1 hour and the reaction mixture was then allowed to return to ambient temperature. The excess diketene was removed by evaporation under reduced pressure (0.7 KPa) at 50°-60° C. After the removal of diketene, a clear yellow, odorless oil of the following approximate formula was obtained:

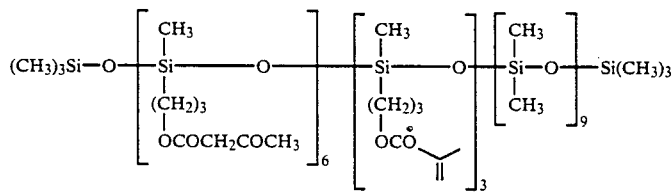

with an acetoacetate group content of 220 meq/100 g.

COMPARATIVE EXAMPLE 6

The procedure of Example 1 was repeated exactly, except that the tin catalyst was replaced with 0.5 g of tetrabutoxytitanium, which corresponds to the introduction of a number of moles of titanium substantially equivalent to the number of moles of tin.

A very strongly colored, blackish oil which could not be decolorized with carbon black and which could not therefore be used, was obtained.

COMPARATIVE EXAMPLE 7

The procedure in Example 1 was repeated, except that the catalyst used was 1.48 g of tetrapropylzirconate, which amounted to a number of moles of zirconium substantially equivalent to the number of moles of tin. The reaction medium became gelled during the removal of MM. A reaction period of 15 hours instead of 20 hours gave the same results.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of an organopolysiloxane comprising acrylate and/or methacrylate functional groups, which comprises at least partially transesterifying, in the presence of a catalytically effective amount of a tin-containing compound (A) having a valency of 4 selected from the group consisting of inorganic compounds of tin and organic compounds of tin selected from dialkyltin oxide, tin carboxylate, dialkytin dicarboxylate, tin chelate or the reaction product of a dialkyltin oxide with an organic ester or alkyl silicate, an organopolysiloxane (B) containing at least two siloxy, u nits per molecule, at least one of such units corresponding to the formula:

in which a is 1 or 2, the symbols R, which may be identical or different, are each a $C_1$-$C_{12}$ alkyl radical, a phenyl radical or a 3,3,3-trifluoropropyl radical, at least 80 mole % of radicals R being methyl radicals, and the symbols Y, which may be identical or different, are each a $C_1$-$C_{18}$ straight or branched chain alkylene linkage, with an ester (C) of the formula:

in which X is a hydrogen atom or a methyl radical and Z is a $C_1$-$C_6$ alkyl radical.

2. The process as defined by claim 1, wherein said organopolysiloxane (B) comprises a diorganopolysiloxane oil having the formula:

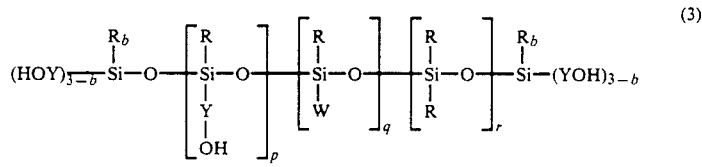

b is 3 or 2;
p is an integer ranging from 1 to 50, with the proviso that p may be equal to 0 when b=2;
q is an integer ranging from 0 to 30;
r is an integer ranging from 0 to 500;
R and Y are as defined in formula (1) above; and
W is a functional group which is inert towards transesterification.

3. The process as defined by claim 1, wherein, upon completion of the transesterification reaction, the alcohol formed, having the formula ZOH, is removed by azeotropic distillation with the ester (C).

4. The process as defined by claim 1, said ester (C) comprising methyl acrylate or methyl methacrylate.

5. The process as defined by claim 1, wherein from 0.001 to 2% by weight of tin metal relative to the weight of the reaction mass (B)+(C) is employed a said catalyst.

6. The process as defined by claim 1, wherein the amount of ester (C) ranges from approximately 1.1 to 5 moles per equivalent of alcohol groups YOH comprising said organopolysiloxane (B).

7. The process as defined by claim 1, comprising first incompletely transesterifying said organopolysiloxane (B), and thence reacting the free alcohol groups YOH of such incomplete reaction product with diketene to provide betaketoester groups of the formula:

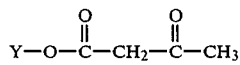

in the presence of an acid or basic catalyst.

8. The process as defined by claim 1, wherein transesterification is carried out at a temperature ranging from about 50° to about 160° C.

9. The process as defined by claim 8, wherein transesterification is carried out at a temperature ranging from about 80° to about 120° C.

10. The process as defined by claim 1, wherein transesterification is carried out at a temperature about that of the azeotropic distillation temperature of ester (C) and free alcohol.

11. The process of claim 1, wherein transesterification is carried out in the presence of about 0.1 to about 1% by weight relative to the weight of the reaction mass of a phenolic antioxidant.

12. The process of claim 1, wherein transesterification is carried out under an inert atmosphere.

13. The process of claim 1, wherein the reaction is carried out in bulk.

14. The process of claim 1, wherein the reaction is carried out in the presence of an organic solvent.

15. The process of claim 14, wherein the solvent is xylene.

16. The process of claim 14, wherein the solvent is toluene.

* * * * *